United States Patent [19]

Amery

[11] 4,314,273
[45] Feb. 2, 1982

[54] CHROMINANCE TRANSCODER
[75] Inventor: John G. Amery, Danville, Ind.
[73] Assignee: RCA Corporation, New York, N.Y.
[21] Appl. No.: 154,597
[22] Filed: May 29, 1980
[51] Int. Cl.³ .............................................. H04N 9/42
[52] U.S. Cl. ................................................... 358/11
[58] Field of Search .................................. 358/11, 19

[56] References Cited
U.S. PATENT DOCUMENTS
3,384,706 5/1968 Davidse ............................. 178/5.4
3,968,514 7/1976 Narahara et al. ...................... 358/4
4,204,220 5/1980 Rutishauser ......................... 358/11

Primary Examiner—Richard Murray
Attorney, Agent, or Firm—E. M. Whitacre; J. S. Tripoli; R. G. Coalter

[57] ABSTRACT

A transcoder useful in a video disc player includes a single multiplier in a chrominance signal path supplied with conversion signals which cause the multiplier to simultaneously frequency translate, conjugate and time-base correct a recovered chrominance signal in one format, such as NTSC, to produce a chrominance signal of another format such as PAL.

14 Claims, 3 Drawing Figures

CHROMINANCE TRANSCODER

This invention relates to transcoders and particularly to chrominance transcoders for providing frequency translation, conjugation and timebase correction of a chrominance signal component of a video signal of one standard to produce a chrominance signal component of another standard.

In the processing of video signals of PAL format for recording on various media (e.g. magnetic tape, optical discs, capacitance discs, etc.) it is advantageous to de-switch and frequency translate the chrominance subcarrier for such purposes as maximizing signal-to-noise ratio minimizing crosstalk, etc. In reproducing signals so recorded, timebase errors introduced by the media must be compensated for in addition to the steps of frequency retranslation and conjugation (i.e., inversion of the V component of the chrominance signal on an alternate line basis).

One aspect of the present invention lies in recognition that where a chrominance signal is repeatedly processed in a transmission channel the probability of degradation of one or more parameters of the signal (e.g., bandwidth, phase, amplitude, etc.) increases with the number of steps in the processing chain. This problem is particularly troublesome where the signal is a chrominance signal because even small pertubations or distortions may result in a visible loss of quality during playback.

A second aspect of the invention lies in recognition of the shortcomings of using separate equalizers, filters, phase compensators and other devices for correcting the shortcomings of each individual stage in a chrominance signal processing chain. Besides the obvious expense involved such an approach can introduce problems due to tolerance limits and stability criteria characteristic of the compensating elements.

The present invention is directed to meeting the need for a chrominance transcoder in which the three steps of frequency translation, conjugation and timebase correction are performed concurrently rather than on a seriatum basis. The principles of the invention may be applied to several signal transmission arrangements employing quadrature double sideband suppressed carrier amplitude modulation (QAM). QAM is used for transmission of the color difference signals R-Y and B-Y in the NTSC and PAL television systems and has been proposed for transmission of the position difference signals L-R and F-B in quadraphonic stereo systems (see, generally, IEEE Transactions on Broadcast and Television Receivers, Vol. BTR-19, No. 4, Nov., 1973).

In accordance with the present invention, a transcoder for converting an input signal of a first format, subject to spurious timebase errors, to an output signal of a second format includes multiplier means responsive to the input signal and to first and second conversion signals for producing the output signal. Circuit means are provided for producing and supplying the conversion signals to the multiplier means during alternate time intervals. The conversion signals exhibit differing frequency components, each includes a timebase error correction component and one includes a component for effecting phase reversal of a selected component of the output signal.

In accordance with a further aspect of the invention the input signal comprises a chrominance signal having U and V subcarrier components and a burst component and the circuit means includes oscillator means for producing an output subcarrier reference signal. A signal generator means responsive to the burst component and the reference signal produces the first conversion signal which causes phase reversal of a selected one of the subcarrier components, i.e. conjugation of the chrominance signal. Converter means responsive to the reference and the first conversion signal produces a second conversion signal which does not affect phase reversal of the selected subcarrier components and switch means are provided for separately applying the two conversion signals to the multiplier means during the alternate time intervals.

In accordance with another aspect of the invention, the converter means includes means for multiplying the reference signal with the first conversion signal to produce a product signal. Means are provided for doubling the frequency of the product signal and for multiplying frequency doubled product signal with the first conversion signal to provide the second conversion signal.

In accordance with a further aspect of the invention the converter means comprises means for multiplying the reference signal with the first conversion signal to produce a product signal and means for multiplying the product signal with the reference signal to produce the second conversion signal.

The foregoing and additional features of the invention are described in detail hereinafter and illustrated in the accompanying drawings wherein like reference designators identify like elements and in which.

Figure 1:
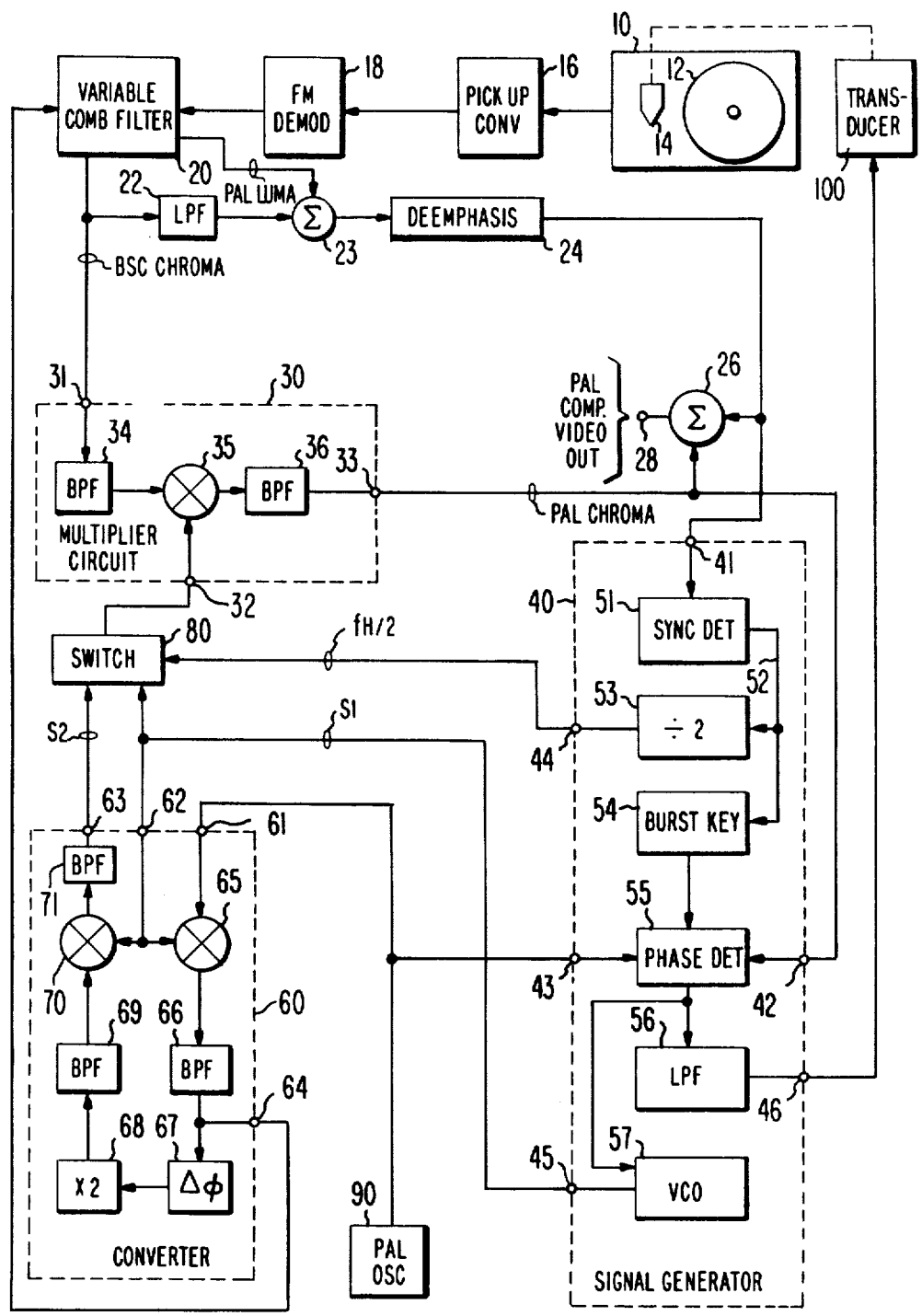
FIG. 1 is a block diagram of a video disc player embodying the invention.

The video disc player of FIG. 1 illustrates use of the invention for producing PAL standard output video signals from a video disc recording conforming generally to the standard proposed by Carnt, et al. in U.S. patent application Ser. No. 822,659 entitled "VIDEO DISC SYSTEMS" filed Aug. 8, 1977 (Now U.S. Pat. No. 4,200,881, which issued Apr. 29, 1980).

There are three salient features of the Carnt, et al. PAL recording standard revelant to the video disc player of FIG. 1. The first is that the PAL subcarrier is "de-switched," that is, the normal phase alternation of the V subcarrier component on alternate lines, of the chrominance signal is inhibited for recording purposes. Secondly, the chrominance subcarrier is shifted in frequency from nominally 4.43 MHz to a lower value and, in effect, "buried" within the luminance band. Carnt, et al. suggest use of a chrominance frequency of about 1.52 MHz which is an odd multiple of half the line frequency. In the following discussion a subcarrier frequency of 2.29 MHz will be assumed. This is also an odd multiple of half the line frequency (less 25 Hz to minimize dot pattern effects), and within the luminance band but being somewhat higher allows for greater vertical detail bandwidth of the composite output signal as will be explained. Thirdly, chrominance burst is recorded at a constant phase angle of 45° relative to the U and V vectors so that brust exhibits substantially equal U and V components. A preferred burst phase is 135° relative to the positive U axis.

Since burst in the Carnt, et al. standard includes equal U and V components, the PAL type "swinging" burst is automatically formed by the transcoder of FIG. 1 which reverses the V component phase from line to line. If burst had no V component, as in the NTSC standard, then the reversal of the V component phase would have no effect on the burst phase. Accordingly, if one wished to apply the principles of the present invention to conversion of a chrominance signal with NTSC burst phasing to one of PAL burst phasing, it would be necessary to suitably change the mode of operation of the transcoder during the burst interval. Illustratively, this could be done by providing a means for phase shifting the chrominance signal by 45° during the burst interval, thereby resulting in a Carnt, et al. type of burst phasing which, as previously explained, is automatically converted to the PAL swinging burst form as the phase of the V component is alternated.

The video disc player of FIG. 1 comprises a turntable 10 for rotating a video disc 12 and a pickup transducer 14 for recovering video information from the disc. Illustratively, it will be assumed that the player is intended for use with a record in which video information is stored in the form of topological variations and recovered by sensing capacitance variations between transducer 14 and the record or disc 12. It will be appreciated, however, that the transcoder of the present invention may be used in connection with other types of disc players, tape players, camera equipment, frame storage units, transmission systems, etc. Disc 12 will be assumed to be recorded in the aforementioned Carnt, et al. format but with a chrominance subcarrier frequency of 2.29 MHz.

The output of transducer 14 is applied to the input of a pickup converter circuit 16 which comprises a capacitance-to-voltage converter responsive to capacitance variations between a stylus in transducer 54 and the record being played for producing an FM output signal voltage representative of the recorded information. Suitable circuits for implementing the capacitance-to-voltage conversion function of pickup circuit 16 are well known. See, for example, U.S. Pat. No. 3,783,196 entitled "HIGH DENSITY CAPACITIVE INFORMATION RECORDS AND PLAYBACK APPARATUS THEREFOR" which issued to T. O. Stanley, Jan. 1, 1974; U.S. Pat. No. 3,972,064 entitled "APPARATUS AND METHODS FOR PLAYBACK OF COLOR PICTURES/SOUND RECORDS" which issued to E. O. Keizer, July 27, 1976 and U.S. Pat. No. 3,711,641 entitled "VELOCITY ADJUSTING SYSTEM" which issued to R. C. Palmer, Jan. 16, 1973.

Video FM demodulator circuit 18 converts the FM signal produced by pickup converter circuit 16 to a video output signal. The video signals recorded on the disc, as previously mentioned, are in "buried subcarrier" (BSC) format. As explained in the Carnt, et al. application (see also U.S. Pat. No. 3,872,498 which issued to D. H. Pritchard, Mar. 18, 1975), in the BSC format chrominance information is represented by a color subcarrier of the general form employed in the NTSC format. However, the chrominance component in BSC format is not located in the high end of the luminance band but rather is buried in a lower portion of the band. In the example of FIG. 1 it will be assumed that the subcarrier frequency is in the vicinity of 2.29 MHz with color subcarrier sidebands extending ±500 KHz thereabout, and with the luminance signal band extending well above the highest color subcarrier frequency (to 3 MHz, for example).

FM demodulator 18 illustratively may be of the pulse counting type or of the phase lock loop (PLL) type. A suitable pulse counting type FM demodulator is disclosed in U.S. Pat. No. 4,038,686 entitled "DEFECT DETECTION AND COMPENSATION" which issued to A. L. Baker, July 26, 1977. An FM demodulator of the PLL type is described in the U.S. Patent Application Ser. No. 948,013 of T. J. Christopher, et al. entitled "FM SIGNAL DEMODULATOR WITH DEFECT DETECTION" which was filed Oct. 2, 1978 (Now U.S. Pat. No. 4,203,134 which issued May 13, 1980).

The composite video signal produced by FM demodulator 18 is separated into a PAL standard luminance component (PAL LUMA) and a buried subcarrier chrominance component (BSC CHROMA) by means of a variable center frequency comb filter 20. Examples of filters of this type are given in U.S. Pat. No. 3,966,610 which issued to H. Kawamoto, Dec. 7, 1976, and the U.S. Pat. application of T. J. Christopher and L. L. Tretter entitled "VIDEO PROCESSING SYSTEM INCLUDING COMB FILTERS," Ser. No. 966,512 which was filed Dec. 4, 1978 (Now U.S. Pat. No. 4,195,309 which issued Mar. 25, 1980).

The reason for using a variable comb filter (rather than one of fixed frequency) is to maximize filtering efficiency by changing the filter center frequency in accordance with timebase errors which may be present in the video signal. This requires supplying a relatively high frequency control signal to filter 20 to operate clock drivers that control the rate of charge transfer in a CCD delay line in the filter. As will be explained, this comb filter center frequency control signal is advantageously produced as a "by-product," in a manner of speaking, of a chroma conversion signal produced by the transcoder of the present invention.

The chrominance output of filter 20 includes low frequency luminance information as well as BSC chrominance information. This low frequency information is passed by means of a lowpass filter 22 to a summing circuit 23 where it is added to the comb filter luminance output; it is the vertical detail of the PAL format luminance signal. Illustratively, lowpass filter 22 may have a cutoff frequency at or below 1.79 MHz so as to prevent summation of the BSC chrominance signal with the PAL luminance signal. As previously mentioned, the advantage of selecting a BSC frequency (2.29 MHz) higher than that proposed by Carnt, et al (1.52 MHz) allows greater vertical detail bandwidth enhancement of the luminance signal since filter 22 may have a higher cutoff frequency.

The output of summation circuit 23 is applied to a deemphasis circuit 24 for removing preemphasis applied to the signal during mastering. After deemphasis, the PAL standard luminance signal is added by means of another summation circuit 26 to the PAL standard chrominance signal produced by the transcoder of the invention to provide a composite video output signal of PAL format at output terminal 28.

The transcoder of FIG. 1 comprises a multiplier circuit 30 for alternately multiplying the BSC chrominance signal produced at the output of comb filter 20 with first and second conversion signals, S1 and S2, produced by a signal generator 40 and a converter 60, respectively. A switch 80, controlled by a half line frequency signal, $f_H/2$, produced by the signal generator, provides alternate selection of the conversion signals supplied to multiplier 30. Both signal generator 40 and converter 60 receive a reference frequency of PAL subcarrier frequency (4.43 MHz) produced by a PAL oscillator 90. The signal S2, as will be explained, provides frequency translation and timebase correction of the BSC chrominance signal but does not alter the U and V vector phase relationship. The signal S1 also provides timebase correction and frequency translation and, additionally, reverses the phase of the V component of the output signal of multiplier circuit 30. Generator 40 in addition to the functions mentioned above, provides a velocity error correction signal to a pickup transducer tangential position control transducer 100 for providing correction of gross timebase errors of both the luminance and chrominance components of the recovered video signal due, for example, to disc eccentricity or warpage. Converter 60 also provides the previously mentioned additional function of maximizing the filtering efficiency of comb filter 20 by generating and varying the frequency of the comb filter center frequency control signal. Alternatively, this function may be provided by deriving an output signal directly from VCO 57 in signal generator 40.

In more detail, multiplier circuit 30 comprises a first input terminal 31 coupled to the chrominance output of filter 20, a second input terminal 32 coupled to the output of switch 80 and an output terminal 33 coupled to the chrominance summing input of summation circuit 26. Terminal 31 is connected via a bandpass filter 34 to one input of a multiplier (e.g., a singly or doubly balanced mixer) 35 in circuit 30 which is connected at its other input to terminal 32 for receiving the conversion signals S1 and S2 from switch 80 and at its output to terminal 33 via an output bandpass filter 36. Filter 34 has a center frequency equal to the BSC chrominance input signal frequency (e.g., 2.29 MHz) and filter 36 has a center frequency equal to the desired PAL chrominance subcarrier output frequency (e.g., 4.43 MHz). Since the bandwidth of the chrominance signal is not significantly altered in the translation, conjugation and timebase stabilization process, filters 34 and 36 may have equal bandwidths (e.g., 1 MHz). Filter 34, however, may be selected to exhibit a slightly wider bandwidth than filter 36 to take into account the chrominance frequency shift due to timebase errors introduced by the media (video disc 12). Conversely, filter 36 need not exhibit a bandwidth greater than the chrominance output signal because the timebase error components present in both of the conversion signals S1 and S2 cancel the timebase errors in the BSC chrominance signal in the multiplication process occuring in multiplier 35.

Signal generator 40 includes a first input terminal 41 for receiving the PAL format luminance signal from deemphasis circuit 24, a second input terminal 42 for receiving the PAL chrominance output signal from multiplier circuit 30, a third input terminal 43 for receiving the PAL subcarrier reference signal from PAL oscillator 90, a first output terminal 44 for supplying the half line rate signal $f_H/2$ to a control input of switch 80, a second output terminal 45 for supplying the first conversion signal S1 to one input of switch 80 and a third output terminal 46 for supplying the velocity error control signal to transducer 100.

Within generator 40, the horizontal synchronizing pulse component of the PAL luminance signal supplied to terminal 41 is detected by means of a sync pulse detector 51 which supplies pulses via conductor 52 for toggling a flip-flop 53 and triggering a burst key generator 54. The output of flip-flop 53 is connected to terminal 44 which causes switch 80 to apply the conversion signals S1 and S2 during alternate horizontal line periods to multiplier circuit 30. Burst key generator 54 is triggered by each pulse on conductor 52 to supply an enabling signal to a phase detector 55 having phase comparison inputs connected to input terminals 42 and 43. The burst key pulses are timed to occur during the "back porch" interval of the horizontal sync period during the color burst interval whereupon phase detector 55 produces an error signal representative of the phase error between the PAL reference frequency produced by oscillator 90 and the color burst component of the PAL chrominance output signal. A timebase error present in the PAL chrominance output signal is thus translated to a proportional error signal at the output of phase detector 55.

The error signal produced by phase detector 55 is stored on an error voltage holding capacitor (not shown) between burst key intervals and applied to a lowpass filter 56 which separates the error signal into a component that is applied to terminal 46 for controlling transducer 100 to provide velocity error correction. The error voltage is also applied to a voltage controlled oscillator 57 which generates and supplies the first conversion signal S1 to terminal 45 for minimizing frequency and phase errors of the PAL chrominance output signal and effecting phase reversal of the V chrominance component.

Filter 56, illustratively, may be of the type described in U.S. Pat. No. 3,965,482 which issued to T. W. Burrus, June 22, 1976. A preferred filter type which includes provisions for transient detection and suppression is disclosed in the U.S. patent application of J. A. Wilber and T. J. Christopher, Ser. No. 074,515 filed Sept. 11, 1979.

Transducer 100 is mechanically coupled to the player pickup transducer 14 for controlling the tangential position of the pickup device relative to the video information track recorded on disc 12. If the disc is out-of-round, for example, transducer 100 changes the effective length of the pickup arm in consonance with the rotation of the disc to compensate for the eccentricity. So called "armstretcher" transducers suitable for this purpose are described, for example, in U.S. Pat. No. 3,882,267 entitled "VIDEO PLAYBACK SYSTEM TRACKING ARM AND PICKUP ASSEMBLY" which issued to M. A. Leedom, May 6, 1975, and U.S. Pat. No. 3,983,318 entitled "VELOCITY ERROR CORRECTION SYSTEM WITH DAMPING MEANS" which issued to M. E. Miller and J. G. Amery, Sept. 28, 1976.

VCO 57 which produces the first conversion signal S1 is selected to have a center frequency of 6.72 MHz which is equal to the sum of the reference frequency of PAL oscillator 90 (4.43 MHz) and the nominal subcarrier frequency (2.29 MHz) of the BSC chrominance signal. Should a timebase error occur in the PAL chrominance output signal at terminal 33 when signal S1 is applied to multiplier 30, the frequency of VCO 57 will change in response to detection of the error by phase detector 55 in a sense to minimize the timebase error. The same action occurs when signal S2 is applied to multiplier 30 since the signal S2 is derived from S1 and so includes a similar timebase error correction component as S1.

It is instructive to note at this point that the signal S1 is of a higher frequency than the BSC chrominance signal and that filter 36 passes the lower product of the two signals, i.e., the difference product. As a result, the upper and lower side bands of the BSC chrominance signal are interchanged in the PAL chrominance signal passed by filter 36 when S1 is applied to multiplier 35. This interchange of side bands or conjugation of the chrominance signal does not occur when the signal S2 is applied to multiplier 35, that is, there is no alteration of the relative phases of the U and V chrominance components. When switch 80 applies the (nominal) 2.14 MHz signal S2 to multiplier 35, sum and difference subcarrier frequencies of (nominally) 4.43 and 0.15 MHz are produced. In this case the sum signal rather than the difference signal is passed via filter 36 to output terminal 33. The multiplication of the BSC chrominance signal by S2 produces a summation signal (2.14+2.29) of PAL standard (4.43) without interchange of the upper and lower chrominance side bands and therefore, no conjugation or side band interchange occurs.

The function of converter 60 is to generate the signal S2 so that when switch 80 couples S2 to multiplier 30 the BSC chrominance signal will experience simultaneously, frequency translation and timebase correction. Converter 60 comprises an input terminal 61 connected to the output of PAL oscillator 90, an input terminal 62 connected to the output of VCO 57, an output terminal 63 connected to an input of switch 80 and an output terminal 64 connected to the center frequency control input of filter 20.

Internally, converter 60 includes a multiplier 65 having inputs connected to terminals 61 and 62 for multiplying the PAL reference frequency (4.43 MHz) with the first conversion signal (6.72 MHz) to produce a product signal equal to the difference therebetween (2.29 MHz) which is passed by a bandpass filter 66 to output terminal 64 for controlling the center frequency of comb filter 20 in accordance with timebase error present in signal S1 for maximizing filtering efficiency as previously mentioned. As an illustration, if a timebase error should occur which would cause an increase in the BSC chrominance frequency, the frequency of VCO 57 will also increase whereby the difference between S1 and the PAL reference frequency will also increase. This change in frequency at terminal 64 in turn will cause an increase in the clock driver frequency of comb filter 20 thereby effectively reducing the comb delay line length so that the "teeth" of the comb will become more closely spaced together and thus re-centered on the assumed higher frequency BSC chrominance signal.

Returning now to the principle functions of converter 60, the product signal produced at the output of filter 66 (nominally 2.29 MHz) is applied to a phase adjuster 67, a frequency doubler 68 and a 4.58 MHz bandpass filter 69. The phase adjusted frequency doubled product signal at the output of filter 69 is then multiplied with the signal S1 (at terminal 62) by means of a multiplier 70 which generates and supplies the signal S2 to output terminal 63 and thence to switch 30. Multiplier 70 produces a sum signal of 11.30 MHz and a difference signal of 2.14 MHz. The product of the difference signal 2.14 MHz (which is passed by bandpass filter 71) and the BSC chrominance signal translates the chrominance signal to PAL standard frequency of 4.43 MHz at the output of multiplier circuit 30 without reversal of V component phase. It is not essential to remove the 11.30 MHz signal from the output of multiplier 70 prior to application of S2 to multiplier 30 since the resultant sum and difference frequencies do not lie within the passband of filter 36 and so filter 71 may be omitted if desired. The purpose of phase adjuster 67 is to compensate for small phase errors which may be introduced, for example, by the delay characteristic of filters 66, 69 and 71. An effect of such a phase error would be to alter the 90° phase relationship of the alternate PAL burst signals. Phase adjuster 67 may be omitted if the phase shift through converter 60 is otherwise sufficiently small as to be negligible.

Figure 2:
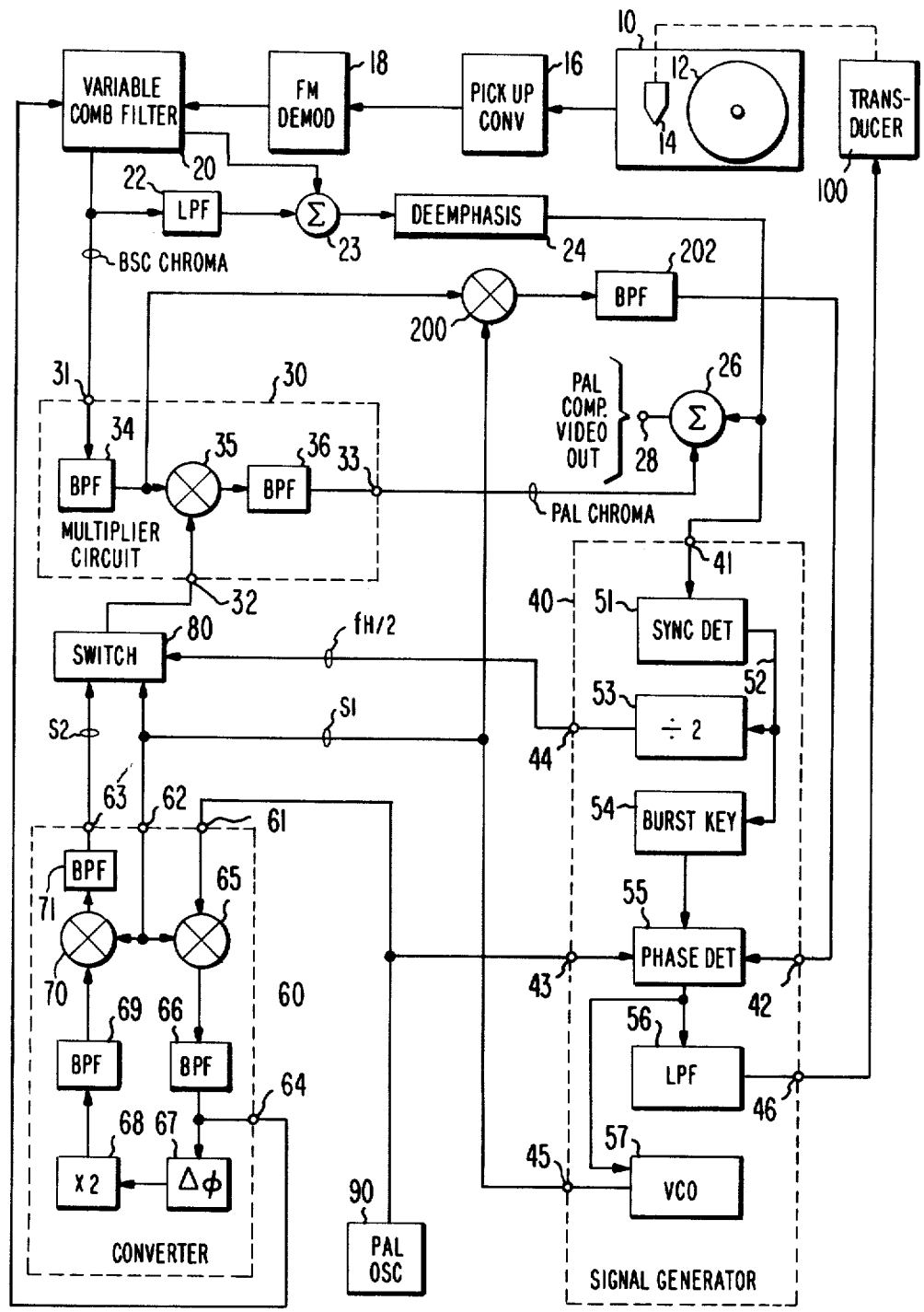
FIG. 2 is a block diagram illustrating a modification of the video disc player of FIG. 1.

In FIG. 2 a second multiplier circuit 200 is added to the player of FIG. 1 for providing a constant phase burst signal (i.e., one having a non-alternating V component) to phase detector 55 of signal generator 40. Recall that in FIG. 1 the phase detector compared the burst component at the output of multiplier circuit 30 with the PAL reference signal produced by oscillator 90. Since the burst component in the PAL format swings ±45° on alternate lines relative to the U axis, a substantial amount of filtering is required at the output of phase detector 55 to smooth the phase detector output (i.e., to remove the resultant half line frequency error component). Filtering requirements are reduced in FIG. 2 by multiplier 200 which provides a timebase corrected and frequency translated chrominance output signal of PAL subcarrier frequency (4.43 MHz) but with a constant phase burst component (45° relative to the U and V axis).

The modification comprises coupling the output of filter 34 to one input of a further multiplier 200, applying the signal S1 to the other input of multiplier 200, bandpass filtering the output of multiplier 200 with filter 202 having a center frequency at the PAL standard 4.43 MHz and applying the output of filter 202 to terminal 42 of signal generator 40. Aside from phase detector 55 receiving a steady burst rather than an alternating PAL burst, the operation of the embodiment of the invention shown in FIG. 2 is the same as in FIG. 1.

Figure 3:
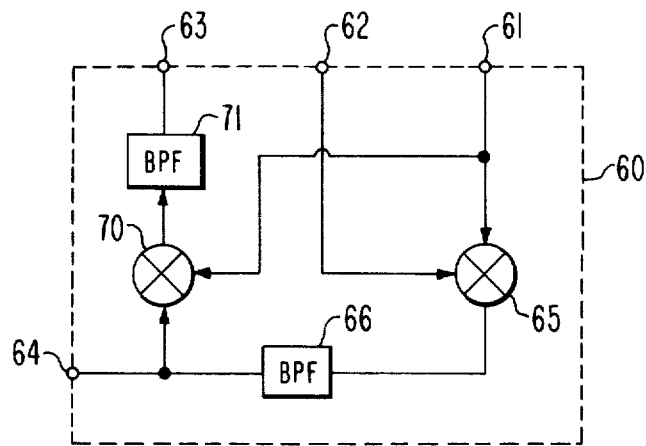
FIG. 3 is a block diagram illustrating a modification of the video disc players of FIGS. 1 and 2.

FIG. 3 illustrates an alternative implementation of converter 60. Multiplier 65 and bandpass filter 66 are connected to terminals 61, 62 and 64 as previously described. Rather than doubling the output of filter 66 and multiplying the product with signal S1, however, the output of filter 66 (2.29 MHz) is multiplied by the output of PAL oscillator 90 by means of multiplier 70 and the resultant signal is bandpass filtered by filter 71 (2.14 MHz) for application to terminal 63. The frequencies of the conversion signal S2 produced at terminal 63 and of the comb filter control signal produced at terminal 64 are the same as in the examples of FIGS. 1 and 2. The modification eliminates the need for frequency doubler 68 and filter 69 or so provides an advantageous simplification of the converter 60 circuitry.

Recall from the discussion of the converter of FIGS. 1 and 2 that filter 71 could be omitted since the frequency of the sum signal (11.30 MHz) produced by multiplier 70 was substantially higher than that of the difference signal (2.14 MHz) and far reoved from the passband of filter 36 (4.43 MHz) in multiplier circuit 30. In the example of FIG. 3, however, the frequencies of sum and difference signals (2.14 and 6.72 MHz) produced by multiplier 70 are more closely spaced together. Accordingly, it is desirable to include bandpass filter 71 (2.14 MHz) in the modified converter so as to minimize the generation of undesired product signals by multiplier 35 in multiplier circuit 30.

What is claimed is:

1. A transcoder for converting a chrominance input signal of a first format to a chrominance output signal of a second format, said chrominance input signal being subject to spurious timebase errors, said transcoder comprising:
  multiplier means responsive to said chrominance input signal and to first and second conversion signals supplied thereto during mutually exclusive time intervals for concurrently effecting frequency translation and timebase correction of said chrominance input signal to produce said chrominance output signal; and
  circuit means for producing and supplying said conversion signals to a common input of said multiplier means, said conversion signals being supplied during alternate time intervals and having differing frequency components, each of said conversion signals including a timebase error correction component, one of said conversion signals including a component for effecting phase reversal of a selected component of said chrominance output signal.

2. A transcoder for converting an input signal of a first format to an output signal of a second format, said input signal being subject to spurious timebase errors and comprising a chrominance signal having U and V subcarrier components and a burst component, said transcoder comprising:
  multiplier means responsive to said input signal and to first and second conversion signals for producing said output signal, said conversion signals having differing frequency components and each including a timebase error correction component;
  oscillator means for producing an output subcarrier reference signal;
  signal generator means responsive to said burst component and said reference signal for producing said first conversion signal, said first conversion signal including a component for effecting phase reversal of said V subcarrier component;
  converter means responsive to said reference signal and said first conversion signal for producing said second conversion signal; and
  switch means for separately applying said first and second conversion signals to said multiplier means during alternate time intervals.

3. A transcoder as recited in claim 2 wherein said converter means comprises:
  first means for multiplying said subcarrier reference signal with said first conversion signal to produce a product signal;
  second means for doubling the frequency of said product signal; and
  third means for multiplying the frequency doubled product signal with said first conversion signal to provide said second conversion signal.

4. A transcoder as recited in claim 2 wherein said converter means comprises:
  means for multiplying said subcarrier reference signal with said first conversion signal to produce a product signal; and
  means for multiplying said product signal with said subcarrier reference signal to produce said second conversion signal.

5. A transcoder as recited in claim 2 wherein said signal generator means comprises:
  controllable oscillator means for producing said first conversion signal in response to a control signal;
  phase detector means responsive to said subcarrier reference signal and to a second burst component for supplying said control signal to said controllable oscillator means; and
  additional circuit means for deriving said second burst component from said burst component of said input signal.

6. A transcoder as recited in claim 5 wherein said additional circuit means comprises an additional multiplier means.

7. A transcoder as recited in claim 5 wherein said additional circuit means comprises:
  second multiplier means having a first input for receiving said input signal, a second input for receiving solely said first conversion signal and an output for providing said second burst component.

8. A transcoder as recited in claim 4 wherein said chrominance signal comprises a component of a composite video signal and said transcoder further comprises:
  filter means having a first input for receiving said composite video signal, a second input for receiving a control signal for controlling the passband characteristic of said filter means and an output for supplying said chrominance signal to said multiplier means; and
  means for supplying said product signal produced by said first means to said second input of said filter means for controlling said passband characteristic in a sense to maximize recovery of said chrominance signal from said composite video signal.

9. A transcoder for converting a chrominance input signal of a first format to a chrominance output signal of a second format, said input signal being subject to spurious timebase errors, said transcoder comprising:
  multiplier means responsive to said chrominance input signal and to first and second conversion signals supplied thereto during mutually exclusive time intervals for concurrently effecting frequency translation, periodic sideband reversal and timebase correction of said chrominance input signal to produce said chrominance output signal;
  oscillator means for producing a stable reference signal having a frequency equal to a desired value of the subcarrier frequency of said chrominance output signal;
  signal generator means for producing said first conversion signal, said first conversion signal having a timebase error correction component characteristic of said spurious timebase errors and having a frequency component equal to a sum of the frequency of said reference signal and the frequency of a color burst component of said input chrominance signal;
  converter means responsive to said reference signal and to said first conversion signal for producing said second conversion signal, said second conversion signal including a frequency equal to a difference between the color burst components of said input and output chrominance signals and;
  switch means for alternately supplying said conversion signals to a common input of said multiplier means.

10. A transcoder for converting a chrominance input signal of a first format to a chrominance output signal of a second format, said input signal being subject to spurious timebase errors, said transcoder comprising:
  multiplier means responsive to said chrominance input signal and to first and second conversion signals for producing said chrominance output signal;

oscillator means for producing a stable reference signal having a frequency equal to a desired value of the subcarrier frequency of said chrominance output signal;

signal generator means for producing said first conversion signal, said first conversion signal having a timebase error correction component characteristic of said spurious timebase errors and having a frequency component equal to a sum of the frequency of said reference signal and the frequency of a color burst component of said input chrominance signal; and converter means responsive to said reference signal and to said first conversion signal for producing said second conversion signal, said second conversion signal including a frequency equal to a difference between the color burst components of said input and output chrominance signals, said converter means comprising:

first means for multiplying said reference signal with said first conversion signal to produce a product signal;

second means for doubling the frequency of said product signal; and third means for multiplying the frequency doubled product signal by said first conversion signal to provide said second conversion signal.

11. A transcoder as recited in claim 9 wherein said converter means comprises:

first means for multiplying said reference signal with said first conversion signal to produce a product signal; and second means for multiplying said product signal with said reference signal to produce said second conversion signal.

12. A transcoder as recited in claim 9 wherein said signal generator means comprises:

controllable oscillator means for producing said first conversion signal in response to a control signal; and phase detector means responsive to said reference signal and to a color burst component of said chrominance output signal for supplying said control signal to said controllable oscillator means.

13. A transcoder as recited in claim 9 wherein said signal generator means comprises:

controllable oscillator means for producing said first conversion signal in response to a control signal; and phase detector means responsive to said reference signal and to a second color burst component for supplying said control signal to said controllable oscillator means; and second multiplier means for multiplying said chrominance input signal with said first conversion signal for producing an output signal including said second color burst component for application to said phase detector means.

14. A transcoder for converting a chrominance input signal of a first format to a chrominance output signal of a second format, said input signal being subject to spurious timebase errors, said chrominance input signal being a component of a composite video signal, said transcoder comprising:

multiplier means responsive to said chrominance input signal and to first and second conversion signals for producing said chrominance output signal;

oscillator means for producing a stable reference signal having a frequency equal to a desired value of the subcarrier frequency of said chrominance output signal;

signal generator means for producing said first conversion signal, said first conversion signal having a timebase error correction component characteristic of said spurious timebase errors and having a frequency component equal to a sum of the frequency of said reference signal and the frequency of a color burst component of said input chrominance signal;

converter means responsive to said reference signal and to said first conversion signal for producing said second conversion signal, said second conversion signal including a frequency equal to a difference between the color burst components of said input and output chrominance signals;

filter means having a first input for receiving said composite video signal, a second input for receiving a control signal for controlling the passband characteristic of said filter means and an output for supplying said chrominance input signal to said multiplier means;

means in said converter means for multiplying said reference signal with said first conversion signal to produce a product signal; and means for supplying said product signal to said second input of said filter means for controlling said passband characteristic in a sense to maximize recovery of said chrominance signal from said composite video signal.

* * * * *